(12) United States Patent
Meynet et al.

(10) Patent No.: US 7,618,076 B2
(45) Date of Patent: Nov. 17, 2009

(54) ADJUSTABLE SEAT FOR A MOTOR VEHICLE AND A MOTOR VEHICLE PROVIDED WITH SAID SEAT

(75) Inventors: Mathieu Meynet, Boulogne Billancourt (FR); Jean Pierre Guignard, Rueil Malmaison (FR); Dominique Cabrie, Magny les Hameaux (FR); Jerome Makala, Ville d'Avray (FR)

(73) Assignee: Renault S.A.S., Boulogne Billancourt (FR)

( * ) Notice: Subject to any disclaimer, the term of this patent is extended or adjusted under 35 U.S.C. 154(b) by 235 days.

(21) Appl. No.: 10/580,002

(22) PCT Filed: Nov. 9, 2004

(86) PCT No.: PCT/FR2004/050576

§ 371 (c)(1),
(2), (4) Date: Dec. 15, 2006

(87) PCT Pub. No.: WO2005/051704

PCT Pub. Date: Jun. 9, 2005

(65) Prior Publication Data

US 2007/0075561 A1 Apr. 5, 2007

(30) Foreign Application Priority Data

Nov. 19, 2003 (FR) .................................. 03 13550

(51) Int. Cl.
*B60N 2/02* (2006.01)
(52) U.S. Cl. ................. 296/65.01; 296/65.13; 296/68.1
(58) Field of Classification Search .............. 296/65.01, 296/65.13, 65.14, 68.1; 297/311, 353
See application file for complete search history.

(56) References Cited

U.S. PATENT DOCUMENTS 3,922,029 A * 11/1975 Urai ........................... 296/68.1
5,717,300 A * 2/1998 Baloche et al. ............. 318/282
6,073,986 A * 6/2000 Neale et al. .................... 296/63

FOREIGN PATENT DOCUMENTS

| DE | 2253307 | * 11/1972 |
|---|---|---|
| FR | 2 663 270 | 12/1991 |
| FR | 2 725 669 | 4/1996 |
| FR | 2 801 851 | 6/2001 |
| JP | 61 094829 | 5/1986 |
| WO | 03/057524 | 7/2003 |

OTHER PUBLICATIONS

U.S. Appl. No. 11/817,970, filed Sep. 7, 2007, Makala, et al.

* cited by examiner

*Primary Examiner*—Dennis H Pedder
*Assistant Examiner*—Pinel E Romain
(74) *Attorney, Agent, or Firm*—Oblon, Spivak, McClelland, Maier & Neustadt, L.L.P.

(57) ABSTRACT

The inventive seat for a motor vehicle comprises a cushion (8), a lower connecting device (13) for connecting the cushion to the lower element (2) of the vehicle structure and a backrest (9), said seat being designed in such a way that the position thereof is ergonomically adjustable. The seat also comprises another upper connecting device (16) for connecting the upper part (15) thereof to the upper element (17) of the vehicle structure, the upper connecting device (16) forms an upper connection which makes it possible to ergonomically adjust the seat position.

19 Claims, 2 Drawing Sheets

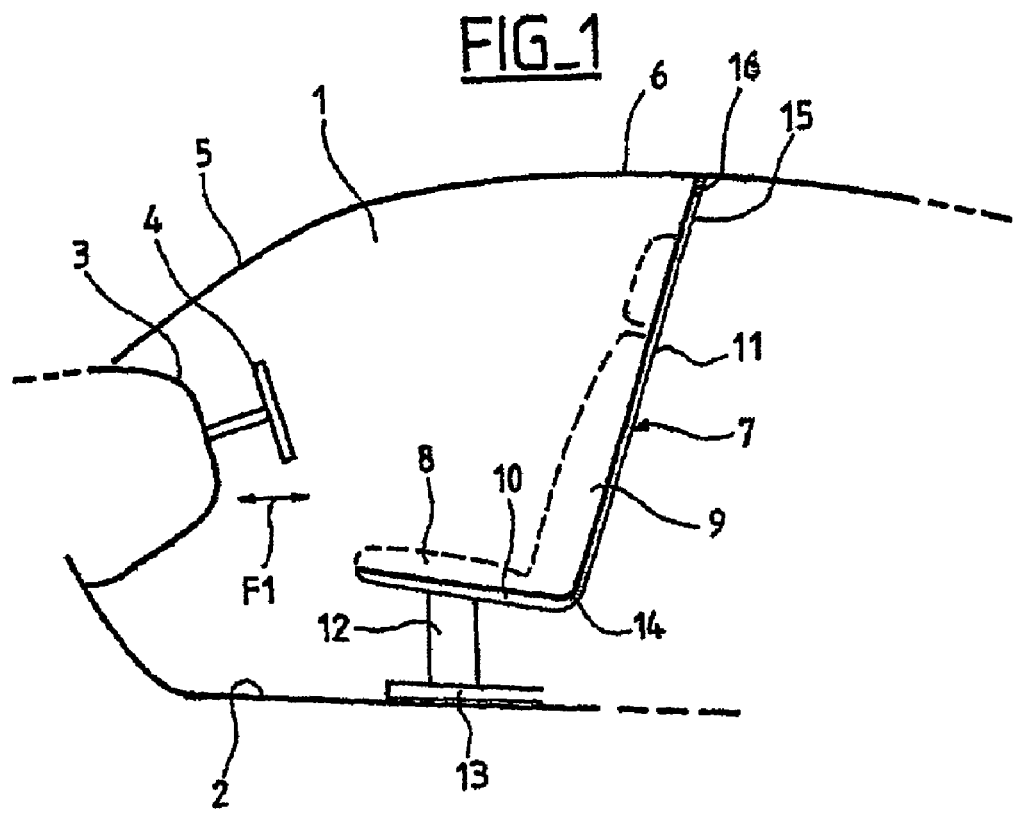
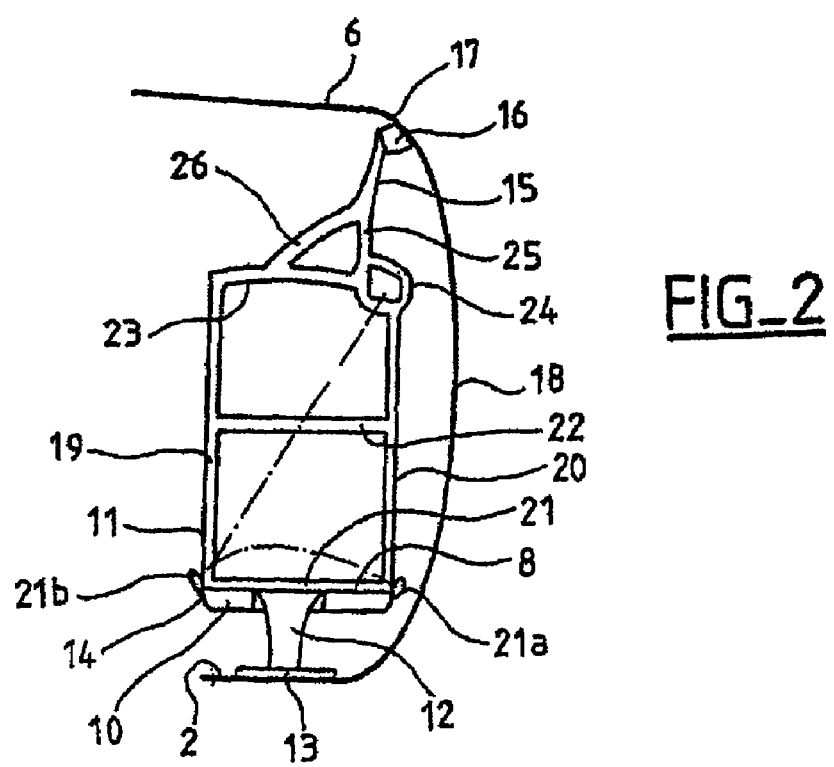

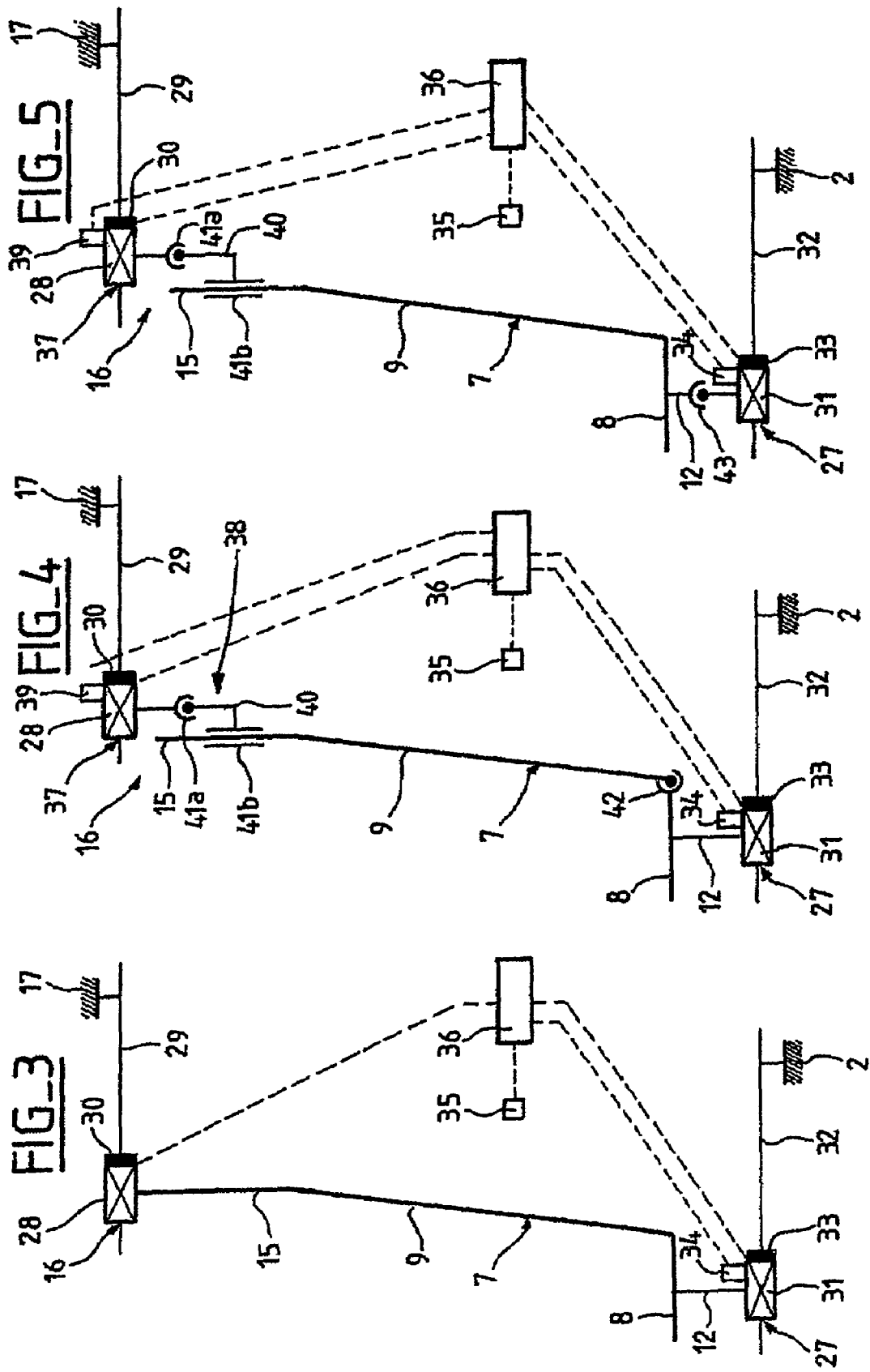

ADJUSTABLE SEAT FOR A MOTOR VEHICLE AND A MOTOR VEHICLE PROVIDED WITH SAID SEAT

The present invention relates to an adjustable seat for a vehicle and a motor vehicle provided with said seat.

The front seats of motor vehicles are generally provided with the possibility of adjusting the position of the seat relative to the structure of the vehicle and adjusting the angle of a backrest relative to a cushion. To achieve this, the backrest is connected to the cushion by a connection articulated along a transverse axis and the cushion is mounted on the floor of the vehicle by means of slide bars. An adjustable seat for a motor vehicle is known from the document FR 2 801 851.

Such a seat, however, which has to be resistant in the event of violent impact of the motor vehicle with an obstacle, has a frame and hinges accordingly provided which are bulky and heavy. A bulky seat is obtained without, however, obtaining satisfactory rigidity of the seat.

The object of the present invention is an adjustable seat for a motor vehicle allowing the design of a seat with a lightweight and slim frame, whilst improving the rigidity and the resistance of the seat.

The object of the present invention is also an adjustable seat for a motor vehicle allowing the protection of the occupants to be improved in the event of longitudinal or lateral impact sustained by a vehicle or in the event of the vehicle overturning.

The object of the present invention is also an adjustable seat for a motor vehicle allowing easy adjustment of the seat which is able to be automated with a limited number of actuators.

The object of the invention is also an adjustable seat for a motor vehicle allowing a space in a vehicle passenger compartment to be retained.

Such an adjustable seat for a motor vehicle comprises a cushion, a lower connecting device for connecting the cushion to a lower structural element of the vehicle, a backrest, the seat being designed for an ergonomic adjustment of the position of the seat. According to one aspect of the invention, the seat comprises an upper connecting device for connecting an upper part of the backrest to an upper structural element of the vehicle, the upper connecting device being suitable for forming an upper connection allowing the ergonomic adjustment of the position of the seat.

The upper connection makes it possible for the upper part of the backrest to be held in place relative to the structure of the vehicle and therefore to increase the rigidity of the seat in its entirety. The seat may be provided with a slim and lightweight frame without impairing the rigidity of the seat or its resistance, in particular in the event of impact of the vehicle with an obstacle. It is conceivable to provide the seat with a three-point seat-belt device with an upper fixing point provided on the upper part of the backrest. In this case, the rigidity conferred to the backrest by the upper connection allows the backrest to resist the tractive force exerted by the seat belt on the upper part of the backrest when the passenger is projected forward.

Moreover, the seat connecting a lower structural element to an upper structural element of the vehicle allows said vehicle structure to be reinforced, the seat frame contributing to the rigidity of the structure of the vehicle in its entirety.

Ergonomic adjustment of the seat position is understood to be an adjustment of the seat position in its entirety, relative to the structure of the vehicle and/or an adjustment of the angle of the backrest relative to the cushion.

Upper structural element of the vehicle is understood to be an upper portion of a pillar, a cross-member, a longitudinal side member or a sheet-metal roof forming the upper structure of the vehicle, i.e. defining an upper limit of a passenger compartment of the vehicle.

Subsequently, longitudinal plane is understood to be a plane substantially perpendicular to the plane of the cushion and to the plane of the backrest; axis or transverse direction is understood to be an axis or a direction perpendicular to a longitudinal plane, and axis or longitudinal direction is understood to be an axis or a substantially horizontal direction and located in a longitudinal plane.

To permit an adjustment of the angle of the backrest, the upper connecting device may be connected to the upper part of the backrest by an intermediate upper connection able to allow a displacement of the upper part of the backrest relative to the upper connecting device with a rotation along a first transverse axis and a translatory motion along a second axis located in a longitudinal plane and different from a longitudinal axis.

In this case, the angle of the backrest or the seat in its entirety may be related to a displacement along a longitudinal axis of the upper connecting device relative to the lower connecting device and a longitudinal displacement of the seat in its entirety is related to a longitudinal displacement relative to the upper connecting device and the lower connecting device.

To permit the backrest to be angled relative to the cushion, the backrest may be connected to the cushion by a lower backrest hinge of transverse axis. To permit an adjustment of the angle of the seat in its entirety, it may be provided that the cushion is connected to the lower connecting device by an intermediate hinge of transverse axis. A combination of a lower backrest hinge and an intermediate cushion hinge may also be provided to increase the possibilities of adjustment.

In one embodiment, the upper connecting device is provided to be fixed relative to an upper structural element and the lower connecting device is suitable for being mounted with the possibility of displacement along a longitudinal axis relative to a lower structural element of the vehicle.

In a further embodiment, the upper connecting device is suitable for being mounted with the possibility of displacement along a longitudinal axis relative to a lower structural element of the vehicle and the lower connecting device is provided to be fixed relative to a lower structural element.

Advantageously, the upper connecting device is suitable for being mounted with the possibility of displacement along a longitudinal axis relative to an upper structural element of the vehicle and the lower connecting device is suitable for being mounted with the possibility of displacement along a longitudinal axis relative to a lower structural element of the vehicle. In this case, both the position of the seat relative to the structure of the vehicle in its entirety, and the angle of the backrest or the seat in its entirety may be adjusted.

Such an embodiment also allows a seat to be conceived which is provided with longitudinal adjustment of the seat position relative to the structure of the vehicle without providing adjustment of the angle of the backrest. To achieve this, a seat is provided which is not equipped with a hinge of transverse axis between the backrest and the cushion or between the cushion and the lower connecting device.

In all cases, the mobile connecting devices may be provided with blocking means equipped with locking/unlocking means to allow or prevent a movement of the seat.

The invention also relates to a motor vehicle provided with at least one seat according to one aspect of the invention, the seat being connected by a lower connecting device to a floor of the vehicle and an upper backrest connecting device to an upper element of the structure of the motor vehicle.

In one embodiment, the vehicle comprises a control unit which is mobile in its entirety relative to the seat, along a longitudinal axis. A mobile control unit, generally comprising a steering wheel and a pedal mechanism in addition to control buttons, may advantageously be provided in all cases where the longitudinal position of the cushion is not adjustable or in the case where an adjustment of the longitudinal position of the cushion relative to the structure of the vehicle is related to an adjustment of the angle of the backrest.

The present invention and its advantages will be better understood by studying the detailed description of embodiments made by way of nonlimiting example and illustrated by the figures, in which:

FIG. 1 shows a schematic view in longitudinal section of the passenger compartment of a motor vehicle provided with a seat according to one aspect of the invention;

FIG. 2 shows a partial transverse sectional view along II-II of the passenger compartment of a motor vehicle provided with a seat according to FIG. 1;

FIG. 3 is a kinematic diagram of an embodiment of a seat;

FIG. 4 shows a kinematic diagram of a second embodiment of a seat; and

FIG. 5 shows a kinematic diagram of a third embodiment of a seat.

In FIG. 1, a passenger compartment 1 of a motor vehicle, shown partially, is defined by a floor 2, an instrument panel 3 provided with a steering wheel 4, a front windshield 5 and a roof 6. A front driver seat denoted by 7 in its entirety is arranged opposite the steering wheel 4.

The seat 7 comprises a cushion 8 and a backrest 9. A frame of the seat 7 is shown in solid lines, padding or upholstery of the seat 7 being defined by dotted lines.

The frame of the seat 7 comprises a cushion portion 10 extending substantially horizontally and being slightly angled toward the rear and a backrest portion or support portion 11 extending substantially vertically and being substantially angled toward the rear. The cushion portion 10 of the frame is connected to the floor 2 by means of a cushion connection in the form of a central block or leg 12 and a lower connecting device 13, the leg 12 having an upper end fixed to the cushion portion 10 and a lower end fixed to the lower connecting device 13. The support portion 11 and the cushion portion 10 are connected by a curved connecting portion 14 forming a rigid lower backrest connection between the cushion portion 10 and the support portion 11. The support portion 11 is provided at its upper end with a fixing arm 15 extending upward from the upper edge of the support portion 11, the end of the arm 15 opposing the support portion 11 being connected to an upper structural element of the motor vehicle by an upper connecting device 16.

As is more visible in FIG. 2, the upper connecting device 16 is arranged between the arm 15 and an upper side member 17 of the vehicle, i.e. a longitudinal structural element of the vehicle defining an upper edge of the roof 6. The passenger compartment 1 is limited laterally by a pillar 18 located substantially to the side of the backrest 9 of the seat 7. Such a pillar 18, referred to as 'central pillar', is generally arranged between a rear-door opening and a front-door opening formed in the structure of the vehicle. Such a pillar contributes to the rigidity of the structure of the motor vehicle, notwithstanding the openings required to access the front and rear seats.

As appears more clearly in FIG. 2 where the seat 7 has been shown without padding, the support portion 11 comprises two lateral pillars 19, 20, a lower cross-member 21, an intermediate cross-member 22 and an upper cross-member 23. A housing portion 24 is formed at the intersection of the pillar 20 located at the side of the central pillar 18 and the upper cross-member 23 of the frame of the support portion 11. The housing portion 24 has the shape of a frame of substantially square section allowing a seat-belt reel, not shown, to be housed and fixed to form an upper fixing point of a seat belt installed on the seat 7 which is also provided with lower fixing means in the form of a first fixing lug 21a provided at the lateral end of the lower cross-member 21, to the side of the central pillar 18, and a second fixing lug 21b provided at the opposing end of the lower cross-member 21 of the support portion 11. The first lug 21a is provided for permanently fixing one end of a seat belt, the other lug 21b being provided to fix a mobile fixing device of an intermediate portion of the seat belt. A seat belt extending between the different fixing points is schematized in dash-dotted lines C.

The frame comprises a substantially vertical limb 25 connecting the arm 15 to the frame 24 and an oblique limb 26 connecting the arm 15 substantially at the center of the upper cross-member 23 of the support portion 11.

In FIG. 3, where the reference numerals for the elements which are similar to those of FIGS. 1 and 2 have been repeated, the upper and lower connections of the seat 7 are suitable for adjusting the longitudinal position of the seat 7 relative to the structure of the vehicle.

The upper connecting device 16 is provided in the form of a first upper carriage 28 attached to the arm 15 and able to slide on an upper longitudinal rail 29 attached to the upper structural element 17 shown schematically by a fixed point. The first carriage 28 may be displaced longitudinally forward or rearward relative to the upper structural element 17, as shown by the arrow F2. An upper blocking device 30 attached to the first carriage 28 locks the position of the first carriage 28 on the upper rail 29. The upper blocking device 30 may be unlocked.

A connecting device for the cushion 13 is provided in the form of a second lower carriage 31 attached to the leg 12 and able to slide on a lower longitudinal rail 32 attached to the floor 2, shown schematically by a fixed point. The lower carriage 31 may be displaced longitudinally forward or rearward relative to the lower rail 32, as shown by the arrow F3. A second lower blocking device 33 attached to the second carriage 31 locks the position of the second carriage 31 on the lower rail 32. The lower blocking device 33 may be unlocked. An actuator 34 associated with the second carriage 31 is able to cause a displacement of the second carriage 31, along the lower rail 32 when the lower blocking device 33 is unlocked. The actuator 34 may be, for example, of the electric motor type.

The seat 7 comprises a control button 35 connected to a control unit 36, which is moreover connected to the upper blocking device 30, to the lower blocking device 33 and to the actuator 34. The control unit 36 comprises memory means for storing a computer program, comprising control modules for the control of actuators and blocking devices associated with connecting devices of the seat 7 and a microprocessor for the implementation of such a program.

To adjust the longitudinal position of the seat 7 controlled by the control button 35, the control unit 36 causes the unlocking of the upper 30 and lower 33 blocking devices, then controls the actuator 34 for a longitudinal displacement of the second carriage 31, which drives the seat 7 in its entirety. Once the desired position is achieved, the blocking devices 30, 33 are locked to ensure the seat 7 is held in position.

Naturally, the blocking devices 30, 33 in the locked position are dimensioned to hold the seat 7 in position in the event of impact sustained by the motor vehicle. Preferably the blocking devices 30, 33 are provided to be in a locked position by default, by being for example urged by resilient elements of the spring type. The blocking devices 30, 33 are in this case provided with an actuator controlled by the control unit 36 and able to exert unlocking forces counter to the resilient elements.

An actuator associated with the lower connecting device 13 has been disclosed. An actuator associated with the upper connecting device 16, or two actuators, i.e. one for the lower connecting device 13 and another for the upper connecting device 16, could be provided.

In a variant with manual adjustment, it may be provided that the seat 7 has no actuator, and that the blocking devices 30, 33 are equipped with manual unlocking means.

The frame of the seat 7, connecting the floor 2 of the passenger compartment to the side member 17 of the roof 6 contributes to the rigidity of the entire structure of the motor vehicle, which allows in particular the protection of the occupants in the event of an accident to be improved, in particular in the event of the vehicle overturning or in the event of lateral impact undergone by the vehicle, by reinforcing the passenger compartment cell of the vehicle. To facilitate access, it is conceivable to limit the depth of the central pillar or to eliminate the central pillar if the rigidity conferred by the seat to the structure of the vehicle is sufficient.

When the blocking devices are locked, the seat is held in place by a lower part and by an upper part of the backrest such that a lightweight and space efficient frame may be provided, whilst ensuring the rigidity of the seat. Moreover, as the upper part of the backrest is held in place by an upper connection, the backrest has improved resistance in the event of front impact of the vehicle. A seat-belt device installed on the seat may therefore be provided. A seat-belt device installed on a seat allows improved positioning of the seat belt on the body of the passenger, in spite of the adjustments of the position of the seat and the angle of the backrest, and improved seat-belt action, to avoid or reduce trauma undergone by the passenger in the event of impact of the vehicle with an obstacle.

The provision of an upper connection and a lower connection of the seat allows connections to be provided which are less resistant and less bulky, whilst improving the resistance of the seat. Thus, as may be seen in FIG. 2, a lower fixing may be provided using a central leg allowing a space which is available below the cushion of the seat to be opened up.

In FIG. 4, where the reference numerals for elements which are similar to those of FIG. 3 have been repeated, the seat 7 differs from the previous embodiment in that the backrest 9 is connected to the cushion 8 by means of a lower backrest hinge 42 able to allow a relative angular displacement between the backrest 9 and the cushion 8 along a transverse axis, and furthermore, in that the arm 15 is connected to the upper connecting device 16 by an intermediate connection 38. The upper connecting device 16 is associated with an upper actuator 39 connected to the control unit 36.

The intermediate connection 38 is provided to allow at least a relative angular displacement between the backrest 9 and the upper connecting device 16 along a transverse axis, and a translatory motion in a longitudinal plane of the backrest 9 relative to the upper connecting device 16 along an axis which is different from a longitudinal axis.

The intermediate connection 38 is provided in the embodiment shown in the form of an intermediate element 40 connected to one end of the first upper carriage 28 by a pivot connection 41a having a degree of freedom in rotation along a transverse axis and connected on the opposing side to the arm 15 by means of a sliding pivot connection 41b, the sliding pivot connection 41b allowing a degree of freedom in rotation along an axis located in a longitudinal plane, i.e. in the plane of the figure, and a rotation along the same axis. The axis of translation of the sliding pivot connection 41b is substantially vertical in this case.

This embodiment allows the possibilities of adjusting the position of the seat 7 to be increased. The adjustments of the seat 7 may be carried out by acting solely on the longitudinal positions of the upper 28 and lower 31 carriages.

A simultaneous displacement of the lower carriage 31 and of the upper carriage 28 in the same direction and at the same speed causes a longitudinal displacement of the seat 7 in its entirety, without altering the angle of the backrest 9 relative to the cushion 8. An adjustment of the longitudinal position of the seat 7 is carried out in same manner as in the embodiment shown by FIG. 3 and disclosed above.

An adjustment of the angle of the backrest 9 may be carried out by displacing the first carriage 28 relative to the second carriage 31.

For example, to move the backrest 9 toward the rear as shown by the arrow F6, the second carriage 31 may be maintained in a fixed position and the first carriage 28 may be displaced toward the rear as shown by the arrow F7. In this case, the upper end of the backrest 9, i.e. the arm 15 is driven toward the rear by the upper carriage 28 and the lower end of the backrest 9 is held in place by the lower backrest hinge 42. The backrest 9 moves, therefore, toward the rear by pivoting about the axis of the lower hinge of the backrest 42. The pivot connection 41a of the intermediate connection 38 allows the arm 15 and the sliding pivot connection 41b to pivot relative to the first carriage 28, the sliding pivot connection 41b allowing the arm of 15 to be displaced relative to the intermediate element 40.

If the first carriage 28 is held fixed and a displacement toward the front of the second carriage 31 is produced, as shown by the arrow F5, a rearward movement of the backrest 9 is also obtained. The cushion 8 is, however, simultaneously displaced toward the front.

When the first carriage 28 and the second carriage 31 are held fixed by the blocking devices 30, 33, an angle of the backrest 9 may not be altered, as, taking account of the movement kinematics of the different seat connections, a rotation of the backrest 9 has to be accompanied by a relative displacement of the first and second carriages 28, 31.

It is noteworthy that the position of the axis of the sliding pivot connection 41b varies when the backrest 9 is angled. It is provided that within a range for adjusting the angle of the backrest 9, the axis of the sliding pivot connection 41b is never aligned with the longitudinal axis of displacement of the first carriage 28, to ensure that simultaneous blocking of the first and second carriages 28, 31 causes the backrest and the seat in its entirety to be blocked.

The control button 35 may be provided to allow both control of the longitudinal position of the seat 7 and control of the angle of the backrest 9. Depending on a position of the control buttons 35, the control unit 36 may unlock the blocking devices 30, 33 from the lower connecting device 13 and the upper connecting device 16, depending on whether the latter have to be displaced or not, and may control in a synchronized manner the lower connecting device 13 and the upper connecting device 16 to obtain the desired longitudinal position and the desired angle of the backrest 9.

It is noteworthy that the upper connection, formed by the carriage 28, the pivot connection 41a and the sliding pivot connection 41b and the lower connection formed by the second carriage 31 are suitable for allowing easy adjustment of the seat requiring a number of limited actuators.

In FIG. 5, where the reference numerals of the elements which are similar to those of FIG. 4 have been repeated, the seat 7 differs from the previous embodiment in that the lower backrest hinge is replaced by an intermediate hinge 43 of transverse axis, provided between the leg 12 and the lower carriage 31. Consequently, in the event of relative displacement in a longitudinal direction of the first carriage 28 and the second carriage 31, the seat 7 is moved in its entirety about an axis defined by the intermediate hinge 43.

Naturally, to increase the possibilities of adjusting the seat 7, both an intermediate hinge 43 and a lower backrest hinge may be arranged on the seat 7, as shown in FIG. 4. In this case, it will advantageously be provided that the intermediate hinge 43 is equipped with locking means to allow the position of the cushion 8 to be maintained and possibly with an actuator for adjusting the position.

In a variant of the embodiments shown in FIGS. 4 and 5, it could be provided that, of the first and second carriages 28, 31, only one carriage may be displaced longitudinally. In this case, it may be provided that an instrument panel 3 may be displaced longitudinally to adjust the position of the steering wheel and a pedal mechanism (not shown) control buttons relative to the cushion 8 of the seat assembly 7, as is shown by an arrow F1 in FIG. 1.

A particular embodiment for the intermediate connection between the arm 15 and the first carriage 28 has been disclosed. Naturally, the invention is not limited to this embodiment. Any connection or combination of connections may be provided, allowing both a displacement of the backrest relative to the structural element in a longitudinal plane and an angular displacement along a transverse axis, whilst being able to prevent displacement of an upper part of the backrest when the blocking devices are locked.

By way of nonlimiting example, it may be provided to replace the sliding pivot connection 41b by a sliding connection, not allowing rotation along the sliding axis. It may be provided that the arm 15 is connected to the intermediate element 40 by a pivot connection of transverse axis and that the intermediate element 40 is connected to the first carriage 28 by a sliding connection or a sliding pivot connection. It may further be provided that the arm 15 is connected by a pivot connection of transverse axis, to a shoe able to slide on a rail attached to the first carriage, the rail extending downward in a direction located in a longitudinal plane and different from the longitudinal direction of displacement of the carriage.

As a result of the invention, a seat is obtained allowing the weight of the frame of a seat to be reduced whilst increasing the rigidity of the seat, in particular in the event of impact. The seat may be suitable for allowing ergonomic adjustments of the position of the seat. The adjustments of the position of the seat may be obtained easily by means of a number of limited actuators. The frame of the lightweight seat allows the habitable space of a passenger compartment of the motor vehicle to be maintained, in particular for the rear passengers. The seat may be used to rigidify the structure of the motor vehicle in its entirety.

The invention claimed is:

1. An adjustable seat for a motor vehicle, comprising:
a cushion,
a backrest positioned adjacent to the cushion,
a lower connecting device to connect the cushion to a lower structural element of the vehicle, wherein the lower connecting device is configured to adjust a position of the seat by moving along the lower structural element,
an upper connecting device connected to an upper structural element of the vehicle, and
an intermediate connecting device connected to the upper connecting device and an upper part of the backrest to allow a displacement of the upper part of the backrest relative to the upper connecting device with a rotation along a first transverse axis and a translatory motion along a second axis located in a longitudinal plane and different from a longitudinal axis, the intermediate connecting device being connected to the upper part of the backrest with a sliding pivot connection such that the backrest slides within the sliding pivot connection to be displaced with respect to the intermediate connecting device, wherein the upper connecting device is configured to adjust the position of the seat by moving along the upper structural element.

2. The seat as claimed in claim 1, wherein the cushion is connected to the lower connecting device by an intermediate hinge of transverse axis.

3. The seat as claimed in claim 1, wherein the backrest is connected to the cushion by a lower backrest hinge of transverse axis.

4. The seat as claimed in claim 1, wherein the upper connecting device is configured to be fixed relative to the upper structural element during displacement of the lower connecting device along a longitudinal axis relative to the lower structural element of the vehicle.

5. The seat as claimed in claim 1, wherein, during displacement of the upper connecting device along a longitudinal axis relative to the upper structural element of the vehicle, the lower connecting device is configured to be fixed relative to the lower structural element.

6. The seat as claimed in claim 1, wherein the upper connecting device is configured to be displaced along a longitudinal axis relative to the upper structural element of the vehicle during displacement of the lower connecting device along a longitudinal axis relative to the lower structural element of the vehicle.

7. The seat as claimed in claim 1, wherein the upper connecting device is equipped with a blocking member able to be unlocked.

8. A motor vehicle provided with at least one seat as claimed in claim 1, the seat being connected by the lower connecting device to a floor of the motor vehicle and by the upper connecting device to the upper structural element of the motor vehicle.

9. The motor vehicle as claimed in claim 8, further comprising:
a control unit mobile along a longitudinal axis relative to the seat.

10. The seat as claimed in claim 1, wherein the lower structural element includes a rail attached to a floor of the vehicle and the lower connecting device slides on the rail.

11. The seat as claimed in claim 1, wherein the upper structural element includes a rail attached to an upper portion of the vehicle and the upper connecting device slides on the rail.

12. An adjustable seat for a motor vehicle, comprising:
a frame including a cushion and a backrest,
a lower connecting device to connect the frame to a lower rail positioned on a floor of the vehicle, wherein the lower connecting device is configured to adjust a position of the seat by moving along the lower rail,
an upper connecting device connected to an upper rail positioned on an upper portion of the vehicle, and
an intermediate connecting device connected to the upper connecting device and an upper part of the backrest to allow a displacement of the upper part of the backrest relative to the upper connecting device with a rotation along a first transverse axis and a translatory motion along a second axis located in a longitudinal plane and different from a longitudinal axis, the intermediate connecting device being connected to the upper part of the backrest with a sliding pivot connection such that the backrest slides within the sliding pivot connection to be displaced with respect to the intermediate connecting device, wherein the upper connecting device is configured to adjust the position of the seat by moving along the upper rail.

13. The seat as claimed in claim 12, wherein the lower connecting device and the upper connecting device are each configured to adjust the position of the seat at a same time.

14. The seat as claimed in claim 12, wherein the lower connecting device is configured to stay at a fixed location along the lower rail while the upper connecting device adjusts the position of the seat.

15. The seat as claimed in claim 12, wherein the upper connecting device is configured to stay at a fixed location along the upper rail while the lower connecting device adjusts the position of the seat.

16. The seat as claimed in claim 12, wherein the intermediate connecting device connected to the upper part of the backrest is configured to adjust the position of the seat when the upper connecting device and the lower connecting device are each stopped at a fixed location.

17. The seat as claimed in claim 12, wherein the intermediate connecting device connected to the upper part of the backrest is configured to adjust the position of the seat when at least one of the upper connecting device and the lower connecting device are also adjusting the position of the seat.

18. The seat as claimed in claim 1, further comprising:
a single leg that is an only connection between the lower connecting device and the cushion.

19. The seat as claimed in claim 12, further comprising:
a single leg that is an only connection between the lower connecting device and the cushion.

* * * * *